(12) United States Patent
Wright

(10) Patent No.: US 11,781,680 B2
(45) Date of Patent: Oct. 10, 2023

(54) PIPE TRIM ASSEMBLY

(71) Applicant: Joshua Wright, Marshall, MI (US)

(72) Inventor: Joshua Wright, Marshall, MI (US)

( * ) Notice: Subject to any disclaimer, the term of this patent is extended or adjusted under 35 U.S.C. 154(b) by 284 days.

(21) Appl. No.: 17/233,896

(22) Filed: Apr. 19, 2021

(65) Prior Publication Data

US 2022/0333717 A1 Oct. 20, 2022

(51) Int. Cl.
*F16L 5/10* (2006.01)
*F16L 41/08* (2006.01)

(52) U.S. Cl.
CPC ............... *F16L 5/10* (2013.01); *F16L 41/08* (2013.01)

(58) Field of Classification Search
CPC .................................... F16L 41/08; F16L 5/10
See application file for complete search history.

(56) References Cited

U.S. PATENT DOCUMENTS

| | | | | |
|---|---|---|---|---|
| 2,901,593 A * | 8/1959 | McNally | ................ | B60Q 1/247 362/546 |
| 3,910,448 A * | 10/1975 | Evans | ................ | B29C 66/1142 D13/152 |
| 5,236,229 A * | 8/1993 | Gonzalez | ................ | F16L 5/10 285/379 |
| D370,274 S | 5/1996 | Menzies | | |
| 6,161,589 A | 12/2000 | Bolotte | | |
| 6,271,467 B1 * | 8/2001 | Book | ................ | H02B 13/005 439/535 |
| 8,453,389 B2 | 6/2013 | Seike | | |
| 8,479,455 B2 * | 7/2013 | Schaefer | ................ | H02G 3/088 52/220.8 |
| 9,068,673 B2 | 6/2015 | Mukai | | |
| 9,340,336 B2 * | 5/2016 | Mullaney | ........... | B65D 21/0227 |
| 9,883,602 B2 * | 1/2018 | Coscarella | ............. | H02G 3/088 |
| 10,018,287 B2 * | 7/2018 | Coscarella | ............. | E04B 1/625 |
| 10,594,121 B2 * | 3/2020 | Yang | ....................... | H02S 40/34 |
| 10,787,804 B2 * | 9/2020 | Coscarella | ................ | F16L 5/10 |
| 11,209,104 B2 * | 12/2021 | Duchet | ............... | F24F 13/0209 |
| 2007/0126229 A1 * | 6/2007 | Krowech | .................. | F16L 5/10 285/189 |
| 2008/0157518 A1 | 7/2008 | Cecilio | | |
| 2014/0232106 A1 * | 8/2014 | Mukai | .................... | F16L 41/086 285/194 |
| 2015/0047719 A1 * | 2/2015 | Bolton | .................... | E03C 1/021 137/359 |
| 2015/0354207 A1 * | 12/2015 | McGuire | .................. | H02G 3/22 52/61 |

(Continued)

FOREIGN PATENT DOCUMENTS

CA 2755097 4/2012

*Primary Examiner* — Babajide A Demuren

(57) ABSTRACT

A pipe trim assembly for trimming a pipe extending through a wall includes a panel that has a pipe opening extending through the panel for having a pipe extending therethrough. The panel has a plurality of connection openings each extending through the panel. Fasteners can be extended through the connection openings for fastening the panel to an exterior wall of a building through which the pipe extends. A gasket is coupled to the panel and the gasket extends around the pipe opening. Moreover, the gasket surrounds the pipe when the pipe is extended through the pipe opening. A frame is removably attachable to the panel such that the frame covers the plurality of connection openings in the panel to enhance the appearance of the panel.

6 Claims, 5 Drawing Sheets

(56) References Cited

U.S. PATENT DOCUMENTS

2016/0341341 A1* 11/2016 Lin ........................... F16L 5/04
2019/0334333 A1* 10/2019 Wade ...................... H02G 1/06
2020/0032519 A1      1/2020 Bond
2021/0148489 A1*  5/2021 Gilstrap .................... F16L 5/10
2021/0359500 A1* 11/2021 Qumsieh ............. H02G 3/0691

* cited by examiner

PIPE TRIM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trim devices and more particularly pertains to a new trim device for trimming a pipe extending through a wall. The device includes a panel with a circular gasket integrated therein which has the pipe extending through the gasket. A frame is positionable on the panel to enhance the ornamental appearance of the panel.

(2) Description of Related Art Including Information Disclosed Under 37 CFR 1.97 and 1.98

The prior art relates to trim devices including a variety of pipe trimming devices that include a panel that is mountable to a wall and a gasket integrated into the panel through which a pipe can extend for trimming around a pipe that penetrates the wall. The prior art discloses a variety of flashing devices that include a frustum and a gasket integrated into the frustum for flashing around a pipe that penetrates a roof. In no instance does the prior art disclose a panel that is mountable to a wall, a gasket integrated into the panel to insertably receive a pipe and a frame that is positionable around the panel for enhancing the ornamental appearance of the panel.

BRIEF SUMMARY OF THE INVENTION

An embodiment of the disclosure meets the needs presented above by generally comprising a panel that has a pipe opening extending through the panel for having a pipe extending therethrough. The panel has a plurality of connection openings each extending through the panel. Fasteners can be extended through the connection openings for fastening the panel to an exterior wall of a building through which the pipe extends. A gasket is coupled to the panel and the gasket extends around the pipe opening. Moreover, the gasket surrounds the pipe when the pipe is extended through the pipe opening. A frame is removably attachable to the panel such that the frame covers the plurality of connection openings in the panel to enhance the appearance of the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
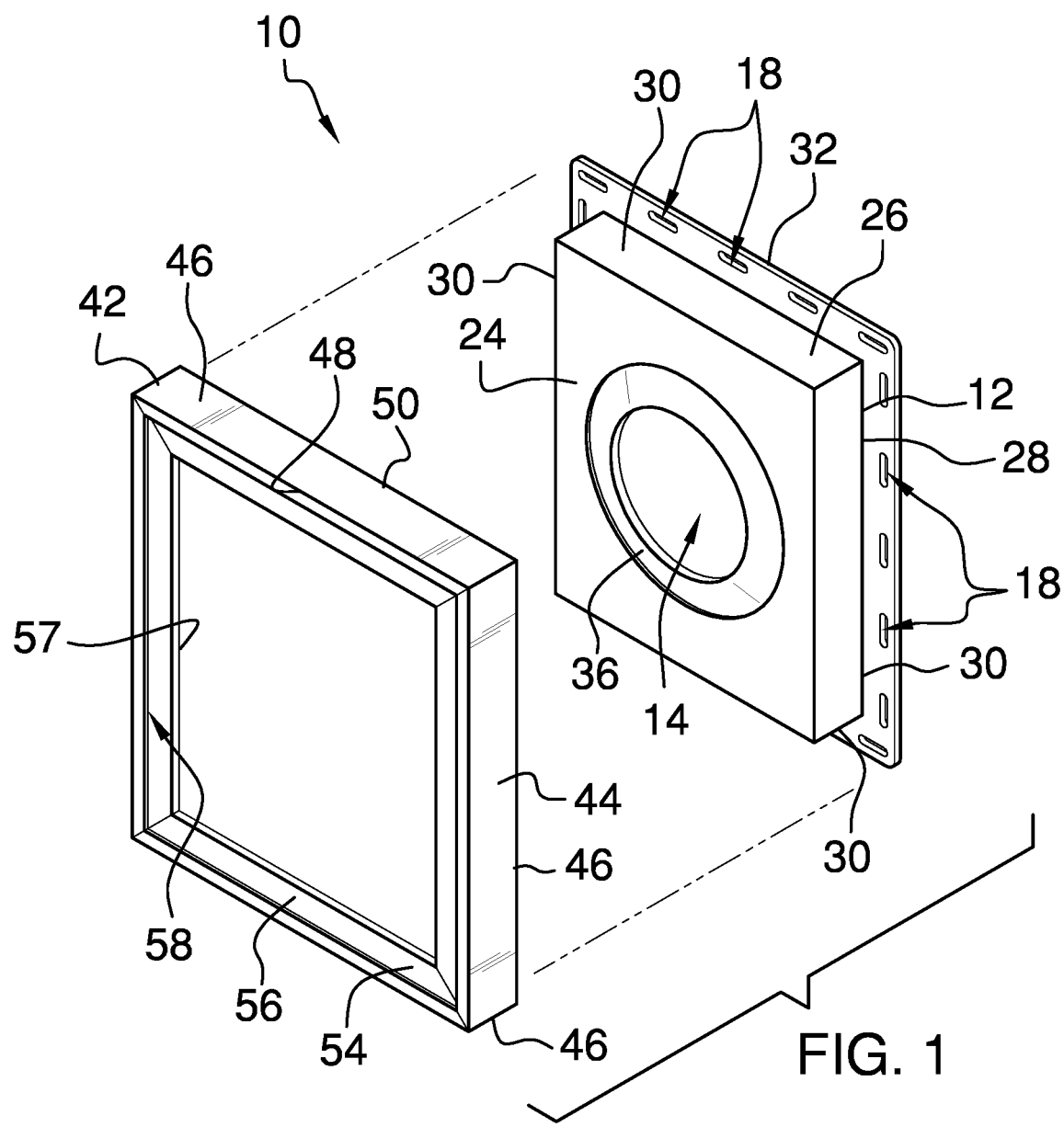
FIG. 1 is an exploded perspective view of a pipe trim assembly according to an embodiment of the disclosure.
Figure 2:
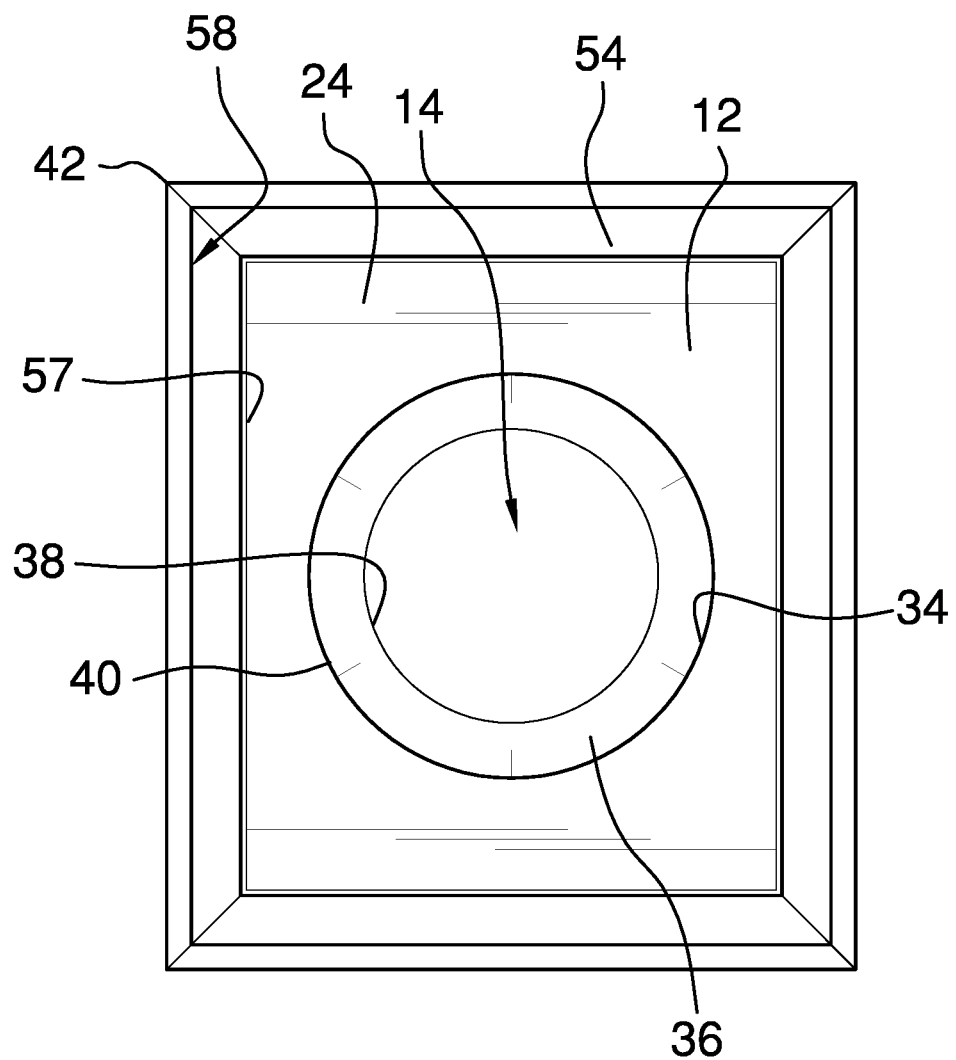
FIG. 2 is a front view of an embodiment of the disclosure.
Figure 3:
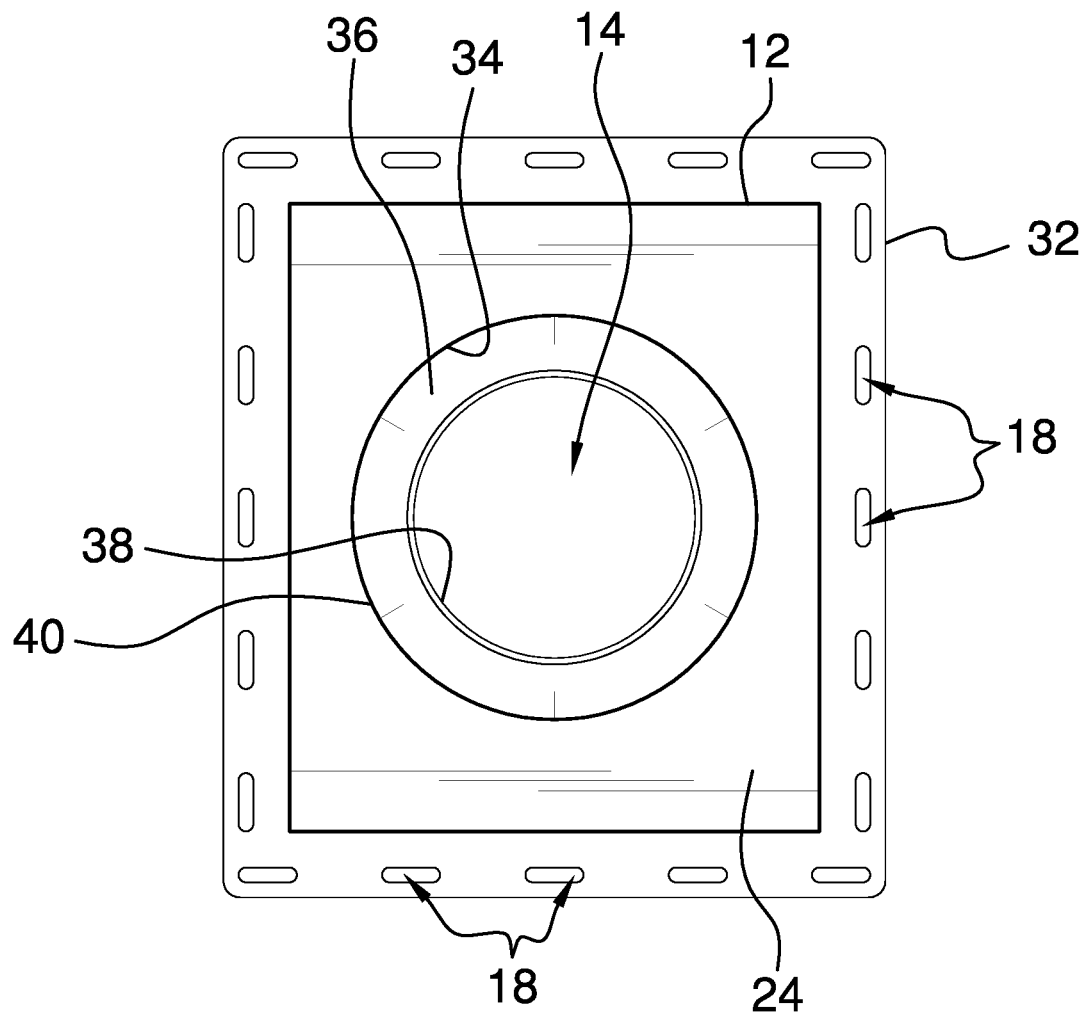
FIG. 3 is a back view of an embodiment of the disclosure.
Figure 4:
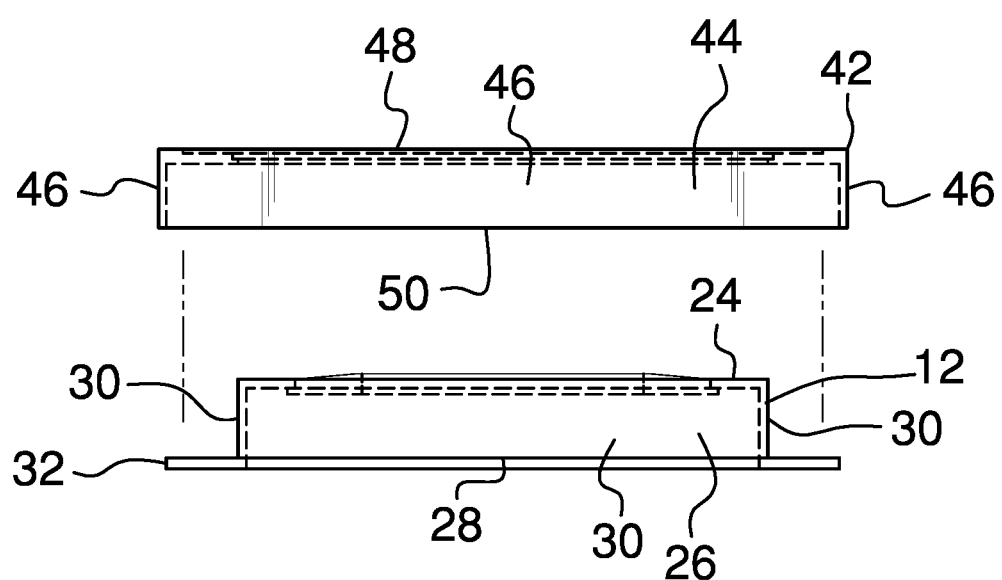
FIG. 4 is a top phantom view of an embodiment of the disclosure.
Figure 5:
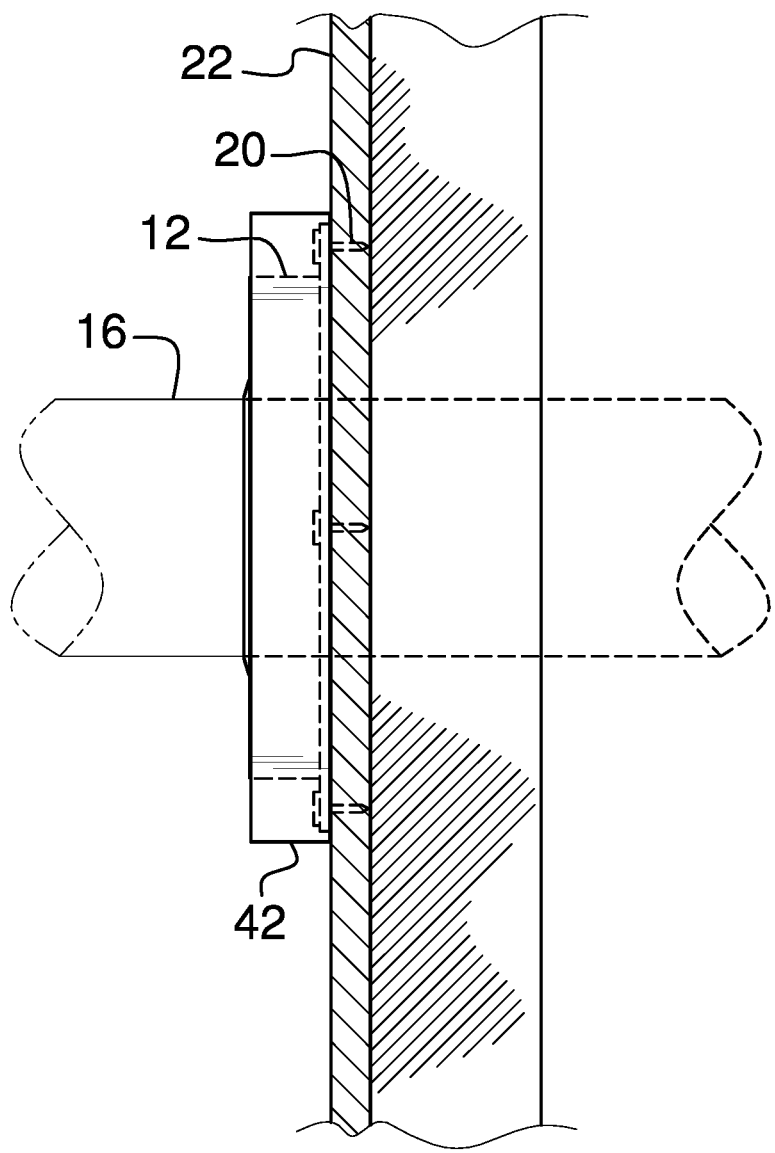
FIG. 5 is a perspective in-use view of an embodiment of the disclosure.

With reference now to the drawings, and in particular to FIGS. 1 through 5 thereof, a new trim device embodying the principles and concepts of an embodiment of the disclosure and generally designated by the reference numeral 10 will be described.

As best illustrated in FIGS. 1 through 5, the pipe trim assembly 10 generally comprises a panel 12 that has a pipe opening 14 extending through the panel 12 for having a pipe 16 extending therethrough. The panel 12 has a plurality of connection openings 18 each extending through the panel 12 and a plurality of fasteners 20 can each be extended through a respective one of the connection openings 18. In this way the panel 12 can be fastened to an exterior wall 22 of a building through which the pipe 16 extends. The building may be a house and the exterior wall 22 may have vinyl siding. The pipe 16 may be a vent pipe for an appliance within the house.

The panel 12 has a forward wall 24 and an outer wall 26 extending rearwardly away from the forward wall 24, and the outer wall 26 has a distal edge 28 with respect to the forward wall 24. The outer wall 26 has a plurality of intersecting sides 30 such that the outer wall 26 defines a rectangular shape. The panel 12 has a border 32 extending outwardly from the outer wall 26 and the border 32 extends around all of the intersecting sides of the outer wall 26. The border 32 is aligned with the distal edge 28 of the outer wall 26 and the border 32 lies on a plane that is oriented parallel with the forward wall 24. The pipe opening 14 extends through the forward wall 24 and the pipe opening 14 has a bounding edge 34. Each of the connection openings 18 extends through the border 32 and the connection openings 18 are spaced apart from each other and are distributed around a full perimeter of the border 32. The border 32 rests against the exterior wall 22 having the forward wall 24 being spaced from the exterior wall 22.

A gasket 36 is coupled to the panel 12 and the gasket 36 extends around the pipe opening 14. In this way the gasket 36 surrounds the pipe 16 when the pipe 16 is extended through the pipe opening 14. The gasket 36 is continuous such that the gasket 36 forms a closed ring, and the gasket 36 has an inwardly facing edge 38 and an outwardly facing edge 40. The outwardly facing edge 40 is coupled to the bounding edge 34 of the pipe opening 14 and the inwardly facing edge 38 engages the pipe 16 when the pipe 16 is extended through the gasket 36. Additionally, the gasket 36 is comprised of a flexible material, such as rubber or other similar material, thereby facilitating the gasket 36 can accommodate pipe 16 is varying diameters.

A frame 42 is provided and the frame 42 is removably attachable to the panel 12. The frame 42 covers the plurality of connection openings 18 in the panel 12 to enhance the appearance of the panel 12. The frame 42 has an outside wall 44 and the outside wall 44 has a plurality of intersecting sides 46 such that the outside wall 44 defines a rectangle. The outside wall 44 has a front edge 48, a back edge 50 and an inwardly facing surface 52 extending between the front edge 48 and the back edge 50.

The frame 42 has a lip 54 extending away from the inwardly facing surface 52 and the lip 54 is oriented perpendicular to the inwardly facing surface 52. The lip 54 is aligned with the front edge 48 and the lip 54 extends around all of the intersecting sides of the outside wall 44. The lip 54 has a front side 56 and a distal edge 57 with respect to the inwardly facing surface 52 of the outside wall 44. The front side 56 has engraving 58 thereon to enhance the ornamental appearance of the lip 54. The distal edge 57 of the lip 54 frictionally engages the outer wall 26 of the panel 12 when the frame 42 is positioned on the panel 12 for removably retaining the frame 42 on the panel 12. Additionally, the back edge 50 of the outside wall 44 abuts the border 32 when the frame 42 is positioned on the panel 12.

In use, the panel 12 is positioned on the wall such that the pipe 16 extends through the gasket 36. The fasteners 20 are each extended through the respective connection openings 18 in the border 32 to attach the panel 12 to the exterior wall 22. In this way the panel 12 and the gasket 36 enhance the appearance of the pipe 16 extending through the exterior wall 22. The typical method of trimming a pipe extending through vinyl siding is to caulk around the pipe 16 in order to seal the hole through which the pipe 16 extends. The gasket 36 and the panel 12 eliminate the need to apply caulk around the hole through which the pipe 16 extends. The frame 42 is positioned around the panel 12 when the panel 12 is fastened into place on the exterior wall 22. In this way the frame 42 conceals the fasteners 20 to enhance the appearance of the panel 12 on the exterior wall 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pipe trim assembly for trimming around a pipe that penetrates siding on an exterior wall, said assembly comprising:

a panel having a pipe opening extending through said panel wherein said pipe opening is configured to have a pipe extending therethrough, said panel having a plurality of connection openings each extending through said panel wherein each of said connection openings is configured to have a fastener extended therethrough for fastening said panel to an exterior wall of a building through which the pipe extends;

a gasket being coupled to said panel, said gasket extending around said pipe opening wherein said gasket is configured to surround the pipe when the pipe is extended through said pipe opening, said gasket being continuous such that said gasket forms a closed ring;

a frame being removably attachable to said panel such that said frame covers said plurality of connection openings in said panel to enhance the appearance of said panel; and wherein said frame has an outside wall, said outside wall having a plurality of intersecting sides such that said outside wall defines a rectangle, said outside wall having a front edge, a back edge and an inwardly facing surface extending between said front edge and said back edge, said frame having a lip extending away from said inwardly facing surface and being oriented perpendicular to said inwardly facing surface, said lip being aligned with said front edge, said lip extending around all of said intersecting sides of said outside wall, said lip having a front side and a distal edge with respect to said inwardly facing surface of said outside wall, said front side having engraving thereon wherein said engraving is configured to enhance the ornamental appearance of said lip.

2. The assembly according to claim 1, wherein said panel has a forward wall and an outer wall extending rearwardly away from said forward wall, said outer wall having a distal edge with respect to said forward wall, said outer wall having a plurality of intersecting sides such that said outer wall defines a rectangular shape, said panel having a border extending outwardly from said outer wall, said border extending around all of said intersecting sides of said outer wall, said border being aligned with said distal edge of said outer wall, said border lying on a plane being oriented parallel with said forward wall.

3. A pipe trim assembly for trimming around a pipe that penetrates siding on an exterior wall, said assembly comprising:

a panel having a pipe opening extending through said panel wherein said pipe opening is configured to have a pipe extending therethrough, said panel having a plurality of connection openings each extending through said panel wherein each of said connection openings is configured to have a fastener extended therethrough for fastening said panel to an exterior wall of a building through which the pipe extends;

a gasket being coupled to said panel, said gasket extending around said pipe opening wherein said gasket is configured to surround the pipe when the pipe is extended through said pipe opening, said gasket being continuous such that said gasket forms a closed ring;

a frame being removably attachable to said panel such that said frame covers said plurality of connection openings in said panel to enhance the appearance of said panel;

wherein said panel has a forward wall and an outer wall extending rearwardly away from said forward wall, said outer wall having a distal edge with respect to said forward wall, said outer wall having a plurality of intersecting sides such that said outer wall defines a rectangular shape, said panel having a border extending outwardly from said outer wall, said border extending around all of said intersecting sides of said outer wall, said border being aligned with said distal edge of said outer wall, said border lying on a plane being oriented parallel with said forward wall;

wherein said pipe opening extends through said forward wall, said pipe opening having a bounding edge; and wherein said gasket has an inwardly facing edge and an outwardly facing edge, said outwardly facing edge being coupled to said bounding edge of said pipe opening wherein said inwardly facing edge is configured to engage the pipe when the pipe is extended through said gasket, said gasket being comprised of a flexible material wherein said gasket is configured to accommodate pipe is varying diameters.

4. A pipe trim assembly for trimming around a pipe that penetrates siding on an exterior wall, said assembly comprising:

a panel having a pipe opening extending through said panel wherein said pipe opening is configured to have a pipe extending therethrough, said panel having a plurality of connection openings each extending through said panel wherein each of said connection openings is configured to have a fastener extended therethrough for fastening said panel to an exterior wall of a building through which the pipe extends;

a gasket being coupled to said panel, said gasket extending around said pipe opening wherein said gasket is configured to surround the pipe when the pipe is extended through said pipe opening, said gasket being continuous such that said gasket forms a closed ring;

a frame being removably attachable to said panel such that said frame covers said plurality of connection openings in said panel to enhance the appearance of said panel;

wherein said panel has a forward wall and an outer wall extending rearwardly away from said forward wall, said outer wall having a distal edge with respect to said forward wall, said outer wall having a plurality of intersecting sides such that said outer wall defines a rectangular shape, said panel having a border extending outwardly from said outer wall, said border extending around all of said intersecting sides of said outer wall, said border being aligned with said distal edge of said outer wall, said border lying on a plane being oriented parallel with said forward wall;

wherein each of said connection openings extends through said border, said connection openings being spaced apart from each other and being distributed around a full perimeter of said border, said border resting against the exterior wall having said forward wall being spaced from the exterior wall.

5. The assembly according to claim 1, wherein said distal edge of said lip frictionally engages said outer wall of said panel when said frame is positioned on said panel for removably retaining said frame on said panel, said back edge of said outside wall abutting said border when said frame is positioned on said panel.

6. The assembly according to claim 1, further comprising:

said panel having a forward wall and an outer wall extending rearwardly away from said forward wall, said outer wall having a distal edge with respect to said forward wall, said outer wall having a plurality of intersecting sides such that said outer wall defines a rectangular shape, said panel having a border extending outwardly from said outer wall, said border extending around all of said intersecting sides of said outer wall, said border being aligned with said distal edge of said outer wall, said border lying on a plane being oriented parallel with said forward wall, said pipe opening extending through said forward wall, said pipe opening having a bounding edge, each of said connection openings extending through said border, said connection openings being spaced apart from each other and being distributed around a full perimeter of said border, said border resting against the exterior wall having said forward wall being spaced from the exterior wall;

said gasket having an inwardly facing edge and an outwardly facing edge, said outwardly facing edge being coupled to said bounding edge of said pipe opening wherein said inwardly facing edge is configured to engage the pipe when the pipe is extended through said gasket, said gasket being comprised of a flexible material wherein said gasket is configured to accommodate pipe is varying diameters; and said distal edge of said lip frictionally engaging said outer wall of said panel when said frame is positioned on said panel for removably retaining said frame on said panel, said back edge of said outside wall abutting said border when said frame is positioned on said panel.

* * * * *